(12) United States Patent
Hellholm et al.

(10) Patent No.: US 10,871,233 B2
(45) Date of Patent: Dec. 22, 2020

(54) AMPHIBIOUS VEHICLE WITH A SEALING ARRANGEMENT

(71) Applicant: BAE Systems Hägglunds Aktiebolag, Örnsköldsvik (SE)

(72) Inventors: Björn Hellholm, Arnäsvall (SE); Max Thorén, Örnsköldsvik (SE); Pär Söderberg, Bjästa (SE); Anders Söderholm, Domsjö (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 135 days.

(21) Appl. No.: 15/758,696

(22) PCT Filed: Jun. 21, 2016

(86) PCT No.: PCT/SE2016/050599
§ 371 (c)(1),
(2) Date: Mar. 8, 2018

(87) PCT Pub. No.: WO2017/044026
PCT Pub. Date: Mar. 16, 2017

(65) Prior Publication Data
US 2018/0216737 A1    Aug. 2, 2018

(30) Foreign Application Priority Data

Sep. 9, 2015    (SE) ...................... 1551155

(51) Int. Cl.
*B60F 3/00*    (2006.01)
*F16J 15/46*    (2006.01)
(Continued)

(52) U.S. Cl.
CPC .............. *F16J 15/46* (2013.01); *B60F 3/003* (2013.01); *B60F 3/0015* (2013.01);
(Continued)

(58) Field of Classification Search
CPC .......... F16J 15/46; F16J 15/021; F16J 15/064; E06B 7/2309; B60F 3/0015; B60F 3/003;
(Continued)

(56) References Cited

U.S. PATENT DOCUMENTS 2,361,298 A * 10/1944 Laddon ................... B64C 1/14
244/129.3
3,007,600 A * 11/1961 Horner ................... F16J 15/46
220/240

(Continued)

FOREIGN PATENT DOCUMENTS

CN    201484097 U    5/2010
CN    101937107 A    1/2011
(Continued)

OTHER PUBLICATIONS

Extended European Search Report received for European Patent Application No. 16844797.7, dated Apr. 10, 2019, 5 pages.
(Continued)

*Primary Examiner* — Eugene G Byrd
(74) *Attorney, Agent, or Firm* — Morrison and Foerster LLP (57) ABSTRACT

The present invention relates to an amphibious vehicle comprising a vehicle frame and a cab supported by said vehicle frame, said cab being connected to said vehicle frame via hinge means so as to allow tilting of said cab about said hinge means between a closed position and an open position, wherein said vehicle comprises a sealing arrangement comprising sealing means arranged to provide liquid tight sealing between the cab and the vehicle frame in said closed position, wherein in the closed position, the sealing arrangement is arranged to provide a confined space for protecting components of said vehicle enclosed inside said space.

12 Claims, 7 Drawing Sheets

(51) Int. Cl.
*F16J 15/06* (2006.01)
*B62D 33/067* (2006.01)
*B62D 55/06* (2006.01)
*F16J 15/02* (2006.01)
*B62D 55/065* (2006.01)

(52) U.S. Cl.
CPC ........... *B62D 33/067* (2013.01); *B62D 55/06* (2013.01); *F16J 15/021* (2013.01); *F16J 15/064* (2013.01); *B62D 55/0655* (2013.01)

(58) Field of Classification Search
CPC .. B62D 33/067; B62D 55/06; B62D 55/0655; B63H 23/321
See application file for complete search history.

(56) References Cited

U.S. PATENT DOCUMENTS

| | | | | |
|---|---|---|---|---|
| 3,023,466 A * | 3/1962 | Landis | ............... | E06B 7/2309 |
| | | | | 49/479.1 |
| 3,037,251 A * | 6/1962 | Landis | ............... | F25D 23/087 |
| | | | | 49/476.1 |
| 3,178,779 A * | 4/1965 | Clark | ............... | B64C 1/14 |
| | | | | 277/646 |
| 3,352,446 A * | 11/1967 | Anderson | ............... | F16J 13/02 |
| | | | | 220/232 |
| 3,689,082 A * | 9/1972 | Satterthwaite | ............... | F16J 15/46 |
| | | | | 277/346 |
| 3,788,651 A * | 1/1974 | Brown | ............... | F16J 15/46 |
| | | | | 277/646 |
| 3,849,092 A * | 11/1974 | Bakke | ............... | B01D 46/0068 |
| | | | | 55/302 |
| 3,940,152 A * | 2/1976 | Fournier | ............... | F16J 15/46 |
| | | | | 277/641 |
| 4,082,344 A | 4/1978 | Anderson | | |
| 4,141,427 A | 2/1979 | Kirchweger et al. | | |
| 4,216,981 A * | 8/1980 | Jensen | ............... | F16J 15/46 |
| | | | | 285/97 |
| 4,624,465 A * | 11/1986 | Rogemont | ............... | F16J 15/46 |
| | | | | 277/646 |
| 5,209,498 A * | 5/1993 | Colin | ............... | B61D 19/02 |
| | | | | 277/646 |
| 5,581,951 A * | 12/1996 | Ryan | ............... | E06B 7/2309 |
| | | | | 49/489.1 |
| 6,116,616 A * | 9/2000 | Bratten | ............... | B23Q 11/10 |
| | | | | 277/646 |
| 7,178,810 B1 * | 2/2007 | Kuhary | ............... | E06B 7/2318 |
| | | | | 277/637 |
| 7,975,793 B1 | 7/2011 | Claas et al. | | |
| 8,366,118 B2 * | 2/2013 | Schilling | ............... | F16J 15/46 |
| | | | | 277/645 |
| 8,813,916 B2 * | 8/2014 | Schilling | ............... | B66B 9/02 |
| | | | | 174/37 |
| 10,538,279 B2 * | 1/2020 | Hellholm | ............... | B62D 33/067 |
| 2005/0012281 A1 * | 1/2005 | Ludwig | ............... | A61L 2/24 |
| | | | | 277/646 |
| 2006/0220328 A1 * | 10/2006 | Deaver | ............... | F16J 15/027 |
| | | | | 277/644 |
| 2009/0166976 A1 * | 7/2009 | Rubner-Petersen | ............... | |
| | | | | B01J 19/0073 |
| | | | | 277/315 |
| 2012/0025471 A1 * | 2/2012 | Andrick | ............... | E03F 3/04 |
| | | | | 277/314 |
| 2014/0203514 A1 | 7/2014 | Colineau et al. | | |
| 2015/0075080 A1 * | 3/2015 | Ellingson | ............... | E06B 7/2309 |
| | | | | 49/483.1 |

FOREIGN PATENT DOCUMENTS

| | | | |
|---|---|---|---|
| CN | 102285333 A | 12/2011 | |
| DE | 102013000982 A1 | 7/2014 | |
| EP | 1998090 A2 | 12/2008 | |
| EP | 2397194 A2 | 12/2011 | |
| GB | 2166092 A | 4/1986 | |
| JP | 10148264 A * | 6/1998 | ............... F16J 15/46 |
| JP | 2003-220900 A | 8/2003 | |
| WO | 2014/196903 A1 | 12/2014 | |
| WO | 2017/044026 A1 | 3/2017 | |

OTHER PUBLICATIONS

International Preliminary Report on Patentability received for PCT Patent Application No. PCT/SE2016/050599, dated Mar. 22, 2018, 7 pages.

International Search Report and Written Opinion received for PCT Patent Application No. PCT/SE2016/050599, dated Aug. 31, 2016, 11 pages.

Office Action received for Swedish Patent Application No. 1551155-3, dated Apr. 13, 2016, 4 pages (English Translation Only).

* cited by examiner

AMPHIBIOUS VEHICLE WITH A SEALING ARRANGEMENT

CROSS REFERENCE TO RELATED APPLICATIONS

This application is a U.S. National Phase patent application of PCT/SE2016/050599, filed Jun. 21, 2016, which claims priority to Swedish Patent Application No. 1551155-3, filed Sep. 9, 2015, the disclosures of which are incorporated herein by reference in their entirety.

TECHNICAL FIELD

The present invention relates to an amphibious vehicle comprising a sealing arrangement. The present invention also relates to a vehicle in the form of a tracked vehicle.

BACKGROUND ART

Vehicles intended for rough terrain such as tracked vehicles, e.g. military tracked vehicles, may need to drive through passages with water requiring sealing arrangement for preventing leakage to sensitive components of the vehicle. It may also be desired to have amphibious function on such vehicles. Vehicle components including sensitive components such as components of the engine configuration need to be accessed by a malfunction or during maintenance. Access to such components is often difficult and time consuming.

Vehicles having sealing arrangements are known.

EP0324131 discloses a hermetic tight device for a motor vehicle, the hermetic tight device comprising tubular sealing strips extending along a rabbet edge of the respective door.

U.S. Pat. No. 4,088,058 discloses a sealing control means for a tank turret said sealing control means comprising an inflated sealing ring arranged around a turret bearing and a sealable vent valve for air supply.

There is however a need to present improvement within sealing arrangements for vehicles such as tracked vehicles.

OBJECTS OF THE INVENTION

An object of the present invention is to provide an amphibious vehicle comprising a sealing arrangement for a vehicle which facilitates efficient sealing during drive of the vehicle.

An additional object of the present invention is to provide an amphibious vehicle comprising a sealing arrangement for a vehicle which facilitates easy access to vehicle components.

An object of the present invention is to provide an amphibious vehicle comprising a sealing arrangement for a vehicle which facilitates amphibious function for the vehicle.

SUMMARY OF THE INVENTION

These and other objects, apparent from the following description, are achieved by an amphibious vehicle comprising a sealing arrangement and a vehicle as set out in the appended independent claims. Preferred embodiments of the system is defined in appended dependent claims.

According to the invention the objects are achieved by an amphibious vehicle comprising a vehicle frame and a cab supported by said vehicle frame. Said cab is connected to said vehicle frame via hinge means so as to allow tilting of said cab about said hinge means between a closed position and an open position. Said amphibious vehicle comprises a sealing arrangement. Said sealing arrangement comprises sealing means arranged to provide a liquid tight sealing between the cab and the vehicle frame in said closed position, wherein in the closed position, the sealing arrangement is arranged to provide a confined space for protecting components of said vehicle enclosed inside said space. Hereby an amphibious vehicle with a sealing arrangement for a vehicle facilitating efficient sealing in the closed position of the cab and easy access in the open position of the cab is obtained. The sealing arrangement facilitates liquid tight sealing by means of the sealing means and/or electromagnetic sealing. Further, an amphibious function of the vehicle is facilitated by providing a liquid tight sealing by means of the sealing means. Further, noise transferred from e.g. engine configuration arranged in vehicle frame and ground engaging members such as track assembly may be reduced by providing the sealing between the cab and the vehicle frame. Where the sealing means comprises inflatable sealing means the sealing means is configured to provide a sealing function even in the non-inflated state.

The sealing arrangement of amphibious vehicle is, in the closed position, arranged to provide a confined space for protecting components of said vehicle enclosed inside said space. By thus providing a confined space in the closed position of the cab vehicle components such as components of an engine configuration are sealingly protected in an efficient way.

Furthermore, assembly and/or maintenance operations are facilitated by means of the tilting cab whilst the sealing arrangement preserves the amphibious functionality of the vehicle by means of protecting the confined space, housing the engine configuration, from liquid leaking into the confined space risking damage to the engine configuration.

According to an embodiment of the amphibious vehicle said cab and said vehicle frame comprise a contact surface, wherein the contact surface of said cab is arranged to face the contact surface of said vehicle frame in the closed position. Thus, the contact surface of said cab is arranged to be aligned with the contact surface of said vehicle frame in the closed position. Hereby efficient sealing between the cab and the vehicle frame is facilitated.

According to an embodiment of the amphibious vehicle said sealing means comprises at least one sealing element extending along the contact surface of said cab and/or the contact surface of said vehicle frame, said surface defining a sealing plane for providing said sealing in the closed position. By thus defining a sealing plane by means of said contact surfaces and having a sealing element extending along the contact surface of the cab and/or a sealing element extending along the contact surface of the vehicle frame an efficient sealing is obtained in the closed position of the cab.

According to an embodiment of the amphibious vehicle said at least one sealing element is a sealing strip. By utilising a sealing strip a simple and efficient sealing of the sealing arrangement is facilitated.

According to an embodiment of the amphibious vehicle the sealing means for providing liquid tight sealing in the closed position comprises a first sealing element of the sealing means arranged in connection to the contact surface of the cab. By thus arranging a first sealing element in connection to the contact surface of the cab, i.e. in connection to an underside portion of the cab, efficient sealing between the cab and the vehicle frame is obtained.

According to an embodiment of the amphibious vehicle the sealing means for providing liquid tight sealing in the closed position comprises a second sealing element of the sealing means arranged in connection to the contact surface of the vehicle frame. By thus arranging a second sealing element in connection to the contact surface of the vehicle frame, i.e. in connection to an upper side portion of the vehicle frame, efficient sealing between the cab and the vehicle frame is obtained.

According to an embodiment of the amphibious vehicle said first sealing element and/or said second sealing element are inflatable. The sealing arrangement comprises means for pressurising said sealing elements. The means for pressurising said sealing elements comprises a compressor unit for pressurising air and an air source connected to said compressor unit for providing air to said compressor unit. Hereby an even more efficient sealing between the cab and the vehicle frame is obtained. Hereby an amphibious function of the vehicle is improved. The pressurised sealing elements are configured to be depressurised prior to tilting the cab to the open position in order to prevent the sealing elements to be dislocated.

According to an embodiment the first sealing element arranged in connection to the contact surface of the cab is inflatable. According to an embodiment the first sealing element arranged in connection to the contact surface of the cab is made of a sealing material suitable for providing a liquid tight sealing against a surface. The sealing material of the first sealing element is according to an embodiment made of a material resistant against heat, cold, liquids such as oil, gasoline etc. The sealing material of the first sealing element is according to an embodiment made of a material resistant to wear. The sealing material of the first sealing element is according to an embodiment made of an elastic material. The sealing material of the first sealing element is according to an embodiment made of rubber. The sealing material of the first sealing element is according to an embodiment made of silicone.

According to an embodiment the second sealing element arranged in connection to the contact surface of the vehicle frame is made of stainless steel or other material with similar properties such as brass, conductive carbon fibre, copper, silver or the like. Hereby efficient sealing between the first sealing element made of rubber or similar material and the second sealing element is obtained. According to an embodiment the second sealing element made of stainless steel or material with similar properties is arranged to be welded to the contact surface of the vehicle frame. The second sealing element is thus attached the contact surface of the vehicle frame by means of a welded joint.

By having the inflatable sealing element arranged in connection to the contact surface of the cab and the sealing element of stainless steel attached to the contact surface of the vehicle frame the vehicle frame is less sensitive to touches during e.g. during assembly or maintenance thus further simplifying access to the space of the vehicle frame.

According to an embodiment of the amphibious vehicle the contact surface of said cab and/or said vehicle frame has a frame configuration. Hereby efficient sealing between the cab and the vehicle frame is obtained.

According to an embodiment of the amphibious vehicle the contact surface of said cab and said vehicle frame has a planar configuration. Hereby efficient sealing between the cab and the vehicle frame is obtained.

According to an embodiment the sealing arrangement further comprises control means for controlling the pressure of the inflatable sealing element.

Hereby control of the status of the sealing arrangement is improved. According to an embodiment the control means is comprised in or comprises a system comprising an electronic control unit for said control. The means for controlling the pressure of the inflatable sealing element comprises a compressor unit, means for determining the pressure of the sealing element such as one or more pressure senor units, means for monitoring the sealing arrangement comprising monitoring the pressure of the sealing element and means for presenting, audibly and/or visually, for an operator of the vehicle the status comprising presenting possible pressure loss/leakage. Leakages may be detected in by means of determining the operation status of the compressor unit, leakages being determined if the compressor unit need to be reactivated or run for a longer time than expected. Leakages may also be determined by means of the pressure sensor units.

According to an embodiment of the amphibious vehicle the sealing means comprises means for providing electromagnetic sealing in the closed position so as to control the emitted electromagnetic signature within said confined space. In the closed position, the means for providing electromagnetic sealing between the vehicle frame and the cab are arranged to provide a metal box, i.e. a Faraday cage for the confined space for protecting components of the vehicle enclosed inside said space. The means for providing electromagnetic provides an electrically conductive connection between the cab and the vehicle frame. Hereby a sealing with electromagnetic compatibility, a so called EMC-sealing is obtained controlling the emitted electromagnetic signature within the space in the closed position of the cab. Hereby single components of the engine configuration do not need to be sealed individually which reduces costs.

According to an embodiment of the amphibious vehicle the means for providing electromagnetic sealing comprises a sealing element arranged in connection to the contact surface of the cab and/or a sealing element arranged in connection to the contact surface of the vehicle frame, said sealing element being arranged to provide an electrically conductive connection between the cab and the vehicle frame in the closed position of the vehicle.

The respective sealing element for the electromagnetic sealing comprises/is made of an electrically conductive material, for example, brass, conductive carbon fibre, copper, silver, steel such as stainless steel or the like. The contact surface of the cab and the contact surface of the vehicle frame are also made of a conductive material such as steel in order to obtain an electromagnetic sealing by means of an electric contact there between.

According to an embodiment the sealing arrangement comprises both said sealing means for providing liquid tight sealing and said means for providing electromagnetic sealing.

According to an embodiment the first sealing arrangement comprises said inflatable sealing element arranged in connection to the contact surface of the cab and the sealing element for electromagnetic sealing also arranged in connection to the contact surface of the cab, wherein both the first sealing element and the sealing element for electromagnetic sealing are arranged to be in sealing contact with the second sealing element arranged on the contact surface of the vehicle frame for liquid sealing and electromagnetic sealing respectively. According to an embodiment an element for electromagnetic sealing is arranged in connection to the contact surface of the cab and an element for electromagnetic sealing is arranged in connection to the contact surface of the vehicle frame, the respective sealing element for electromagnetic sealing being arranged to be in electrically conductive contact in the closed position of the vehicle.

According to an embodiment of the amphibious vehicle the means for providing electromagnetic sealing comprises the sealing element comprising the material suitable for liquid tight sealing such as rubber and/or silicone, the sealing element for liquid tight sealing further comprising an electrically conductive material so as to provide an electrically conductive contact between the contact surface of the cab and the contact surface of the vehicle frame for providing, in addition to liquid tight sealing, an electromagnetic sealing. The sealing element is thus composed of a material for liquid tight sealing and an electrically conductive material.

According to an embodiment of the amphibious vehicle the means for providing electromagnetic sealing comprises the inflatable sealing element, the inflatable sealing element being comprising, in addition to the material suitable for liquid tight sealing such as rubber and/or silicone, an electrically conductive material so as to provide an electrically conductive contact between the contact surface of the cab and the contact surface of the vehicle frame for providing, in addition to liquid tight sealing, an electromagnetic sealing. Thus, the inflatable sealing element comprises means for providing electromagnetic sealing. The inflatable sealing element is thus composed of a material for liquid tight sealing and an electrically conductive material.

According to an embodiment of the amphibious vehicle the at least one sealing element extending along the contact surface of said cab is arranged recessed into a recess (R) on the underside of the cab so that a portion of the cab overhangs the sealing plane when the cab is in the closed position.

Hereby additional protection of the sealing arrangement from influence of the environment is provided.

According to an embodiment said vehicle is a tracked vehicle.

According to an embodiment said vehicle is an articulated vehicle.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Herein the term "link" refers to a communication link which may be a physical connector, such as an optoelectronic communication wire, or a non-physical connector such as a wireless connection, for example a radio or microwave link.

Herein the term "engine configuration" refers to any suitable means for driving the vehicle. "Engine configuration" comprises according to an embodiment an engine. The engine is according to an embodiment a combustion engine. "Engine configuration" comprises according to an embodiment an electric motor. "Engine configuration" comprises according to an embodiment other parts of a drivetrain. "Engine configuration" comprises components for connecting an engine/motor such as cables, conduits or the like. The term "engine configuration" may refer to an engine configuration for providing any suitable power supply for the propulsion of the vehicle. The term "engine configuration" may refer to an engine configuration for providing diesel-electric drive of the vehicle. The term "engine configuration" may refer to an engine configuration for providing hybrid-powered drive of the vehicle. The term "engine configuration" may refer to an engine configuration for providing electric drive of the vehicle, where power according to one alternative is supplied by means of an energy storage device such as a battery unit, fuel cell or capacitor unit.

With reference to FIGS. 1a-b, 2a-b different views of a tracked vehicle 1 according to the present invention is shown.

Figure 10:
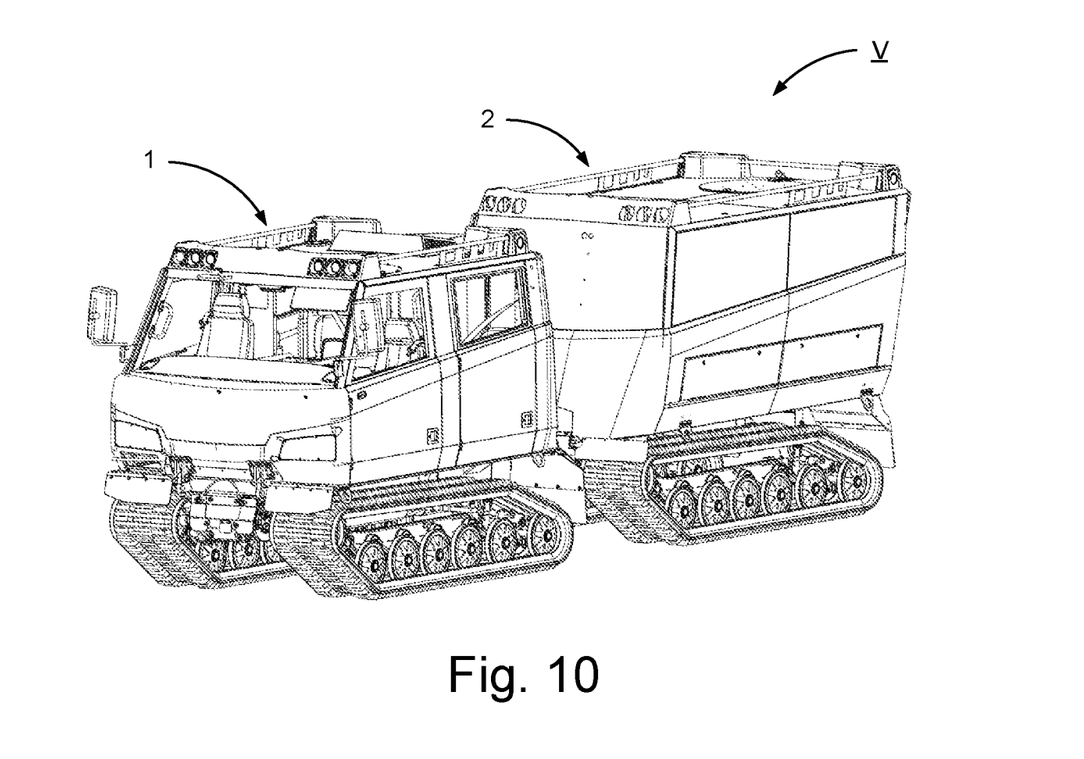
FIG. 10 schematically illustrates an articulated vehicle comprising the vehicle in FIG. 1a according to an embodiment of the present invention.

The vehicle 1 is according to an embodiment part of an articulated vehicle V illustrated in FIG. 10. The articulated vehicle V is provided with a front vehicle 1 and a rear vehicle 2. The vehicle 1 thus in that embodiment constitutes the front vehicle 1 of the articulated vehicle I. Thus, the front vehicle 1 and the rear vehicle 2 are steerably interconnected by means of a steering device, not shown. The front vehicle 1 and rear vehicle 2 are hereby interconnected over a link mechanism of the steering device, the front vehicle 1 and rear vehicle being mutually pivotable by means of the link mechanism of the steering device. In e.g. FIGS. 1a and 1b a shaft configuration 70 of the front vehicle 1 connectable to the rear vehicle 2 is shown.

The vehicle 1 comprises a vehicle frame 10 and a cab 20. The cab 20 is supported by the vehicle frame 10.

Figure 3:
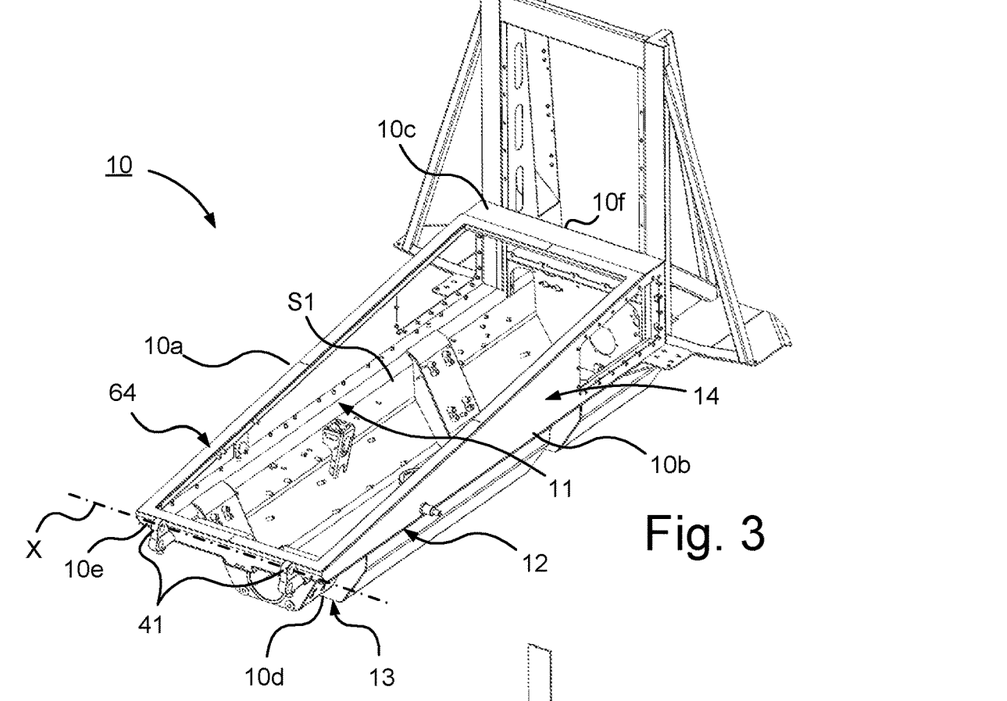
FIG. 3 schematically illustrates a perspective view of a vehicle frame of the vehicle in FIG. 1a according to an embodiment of the present invention.

As illustrated in FIG. 3, the vehicle frame 10 has a right side 10a, a left side 10b, an upper side 10c, an underside 10d, a front side 10e and a rear side 10f.

The vehicle frame 10 has a rectangular shape formed by the sides 10a, 10b, 10e, 10f of the vehicle frame 10. The vehicle frame 10 comprises a contact surface 14c of the upper side 10c, the contact surface 14c being constituted by the uppers side of the rectangular framed shape of the vehicle frame 10.

Figure 1A:
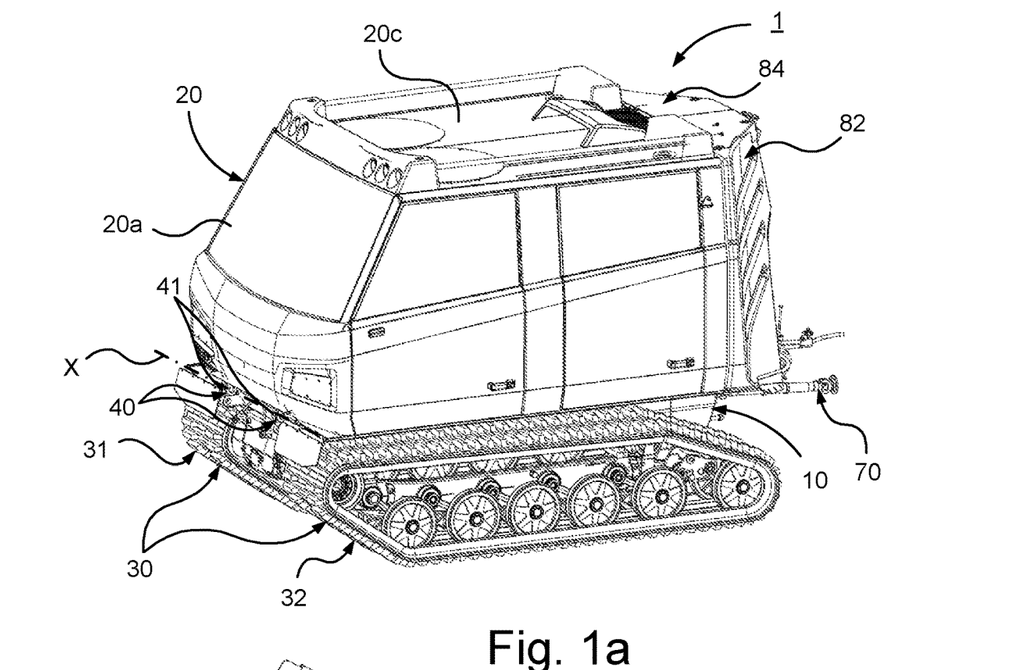
FIG. 1a schematically illustrates a perspective view of a tracked vehicle with the cab in a closed position according to an embodiment of the invention.
Figure 1B:
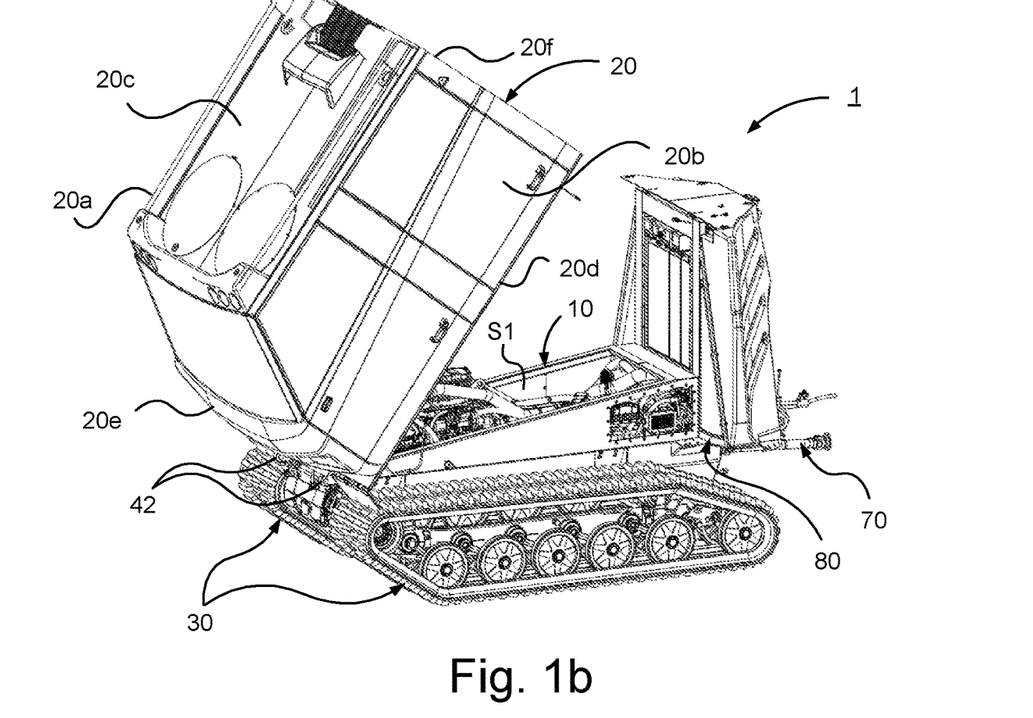
FIG. 1b schematically illustrates a perspective view of the vehicle in FIG. 1a with the cab tilted to an open position.

As illustrated in FIG. 1b, the cab 20 has a right side 20a, a left side 20b, an upper side 20c, an underside 20d, a front side 20e and a rear side 20f.

The vehicle 1 comprises a pair of track assemblies 30. Said pair of track assemblies 30 comprises two track assemblies 31, 32 arranged on opposite sides of the vehicle 1, i.e. a right track assembly 31 arranged on the right side of the vehicle 1 and a left track assembly 32 arranged on the left side of the vehicle 1.

The pair of track assemblies 30 is attached to a respective side of the vehicle frame 10. The right track assembly 31 is attached to the right side of the vehicle frame 10 and the left track assembly 32 is attached to the left side of the vehicle frame 10.

Figure 2A:
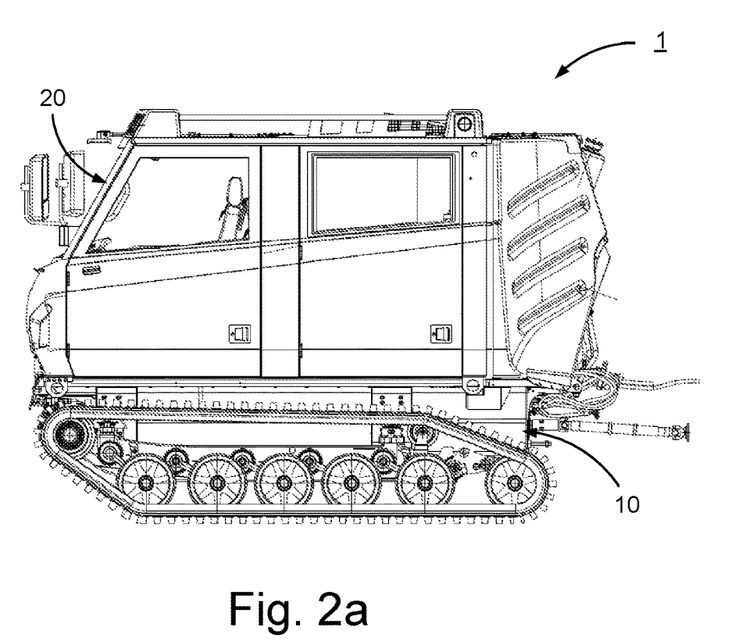
FIG. 2a schematically illustrates a side view of the vehicle in FIG. 1a with the cab in the closed position.
Figure 2B:
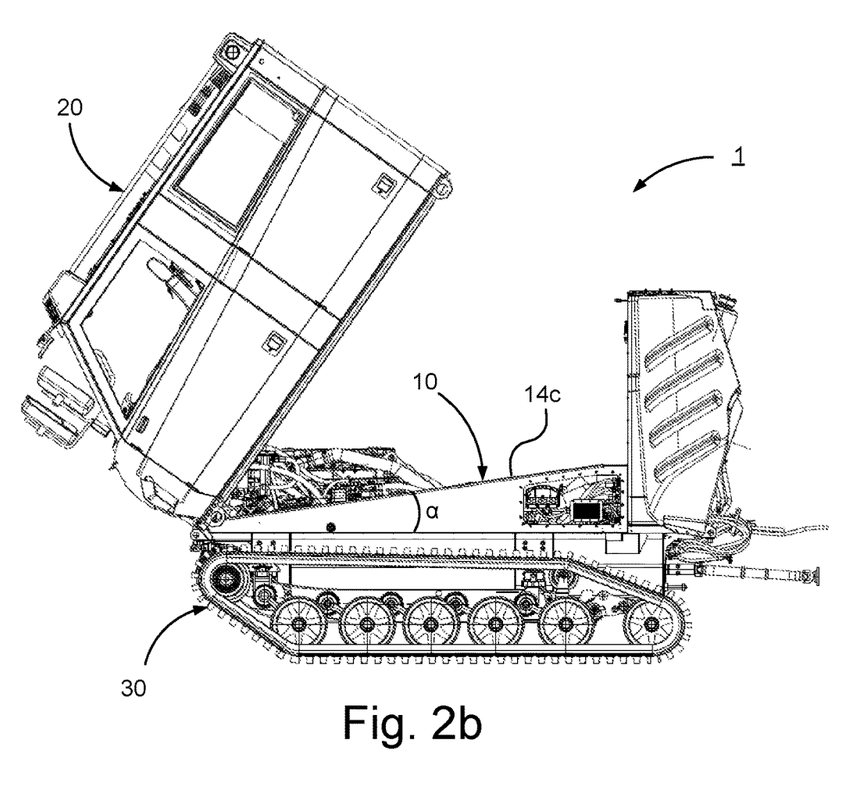
FIG. 2b schematically illustrates a side view of the vehicle in FIG. 1a with the cab in the open position.

The cab 20 is connected to the vehicle frame 10 via hinge means 40 so as to allow tilting of said cab about said hinge means 40 between a closed position and an open position. FIGS. 1a and 2a illustrates the vehicle 1 with the cab 20 in the closed position the and FIGS. 1b and 2b the vehicle 1 with the cab 20 in the open position. The hinge means 40 comprises hinge members 41 arranged on the vehicle frame 10 and hinge members 42 arranged on the cab 20.

The cab is according to an embodiment pivotable about an axis X of said hinge means 40.

The cab 20 is arranged to be fixed to the vehicle frame 10 in the closed position.

The vehicle 1 comprises an engine configuration 50 for driving the vehicle 1. The engine configuration 50 is arranged to propel the vehicle. The engine configuration 50 is arranged to drive the tracks of the track assembly 30 by means of driving the drive wheels of the track assembly 30.

The engine configuration 50 of the vehicle 1 is arranged to be housed in the vehicle frame 10. The vehicle frame 10 is thus arranged to receive the engine configuration 50. The vehicle frame thus has an opening on the upper side for introducing the engine configuration 50 into the vehicle frame 10.

As illustrated in FIG. 3, the vehicle frame 10 comprises a pair of separated longitudinal wall elements 11, 12 extending in the longitudinal direction of the vehicle 1 and a bottom element 13 connecting said pair of longitudinal wall elements 11, 12 so as to form a space S1 for supporting and housing the engine configuration. The separated wall elements 11, 12 comprise a right wall element 11 and a left wall element 12.

The vehicle frame 10 may be made of any suitable material. The vehicle frame 10 is according to an embodiment made of metal. The vehicle frame 10 may be made of any suitable metal. The vehicle frame 10 is according to an embodiment made of steel.

Figure 4:
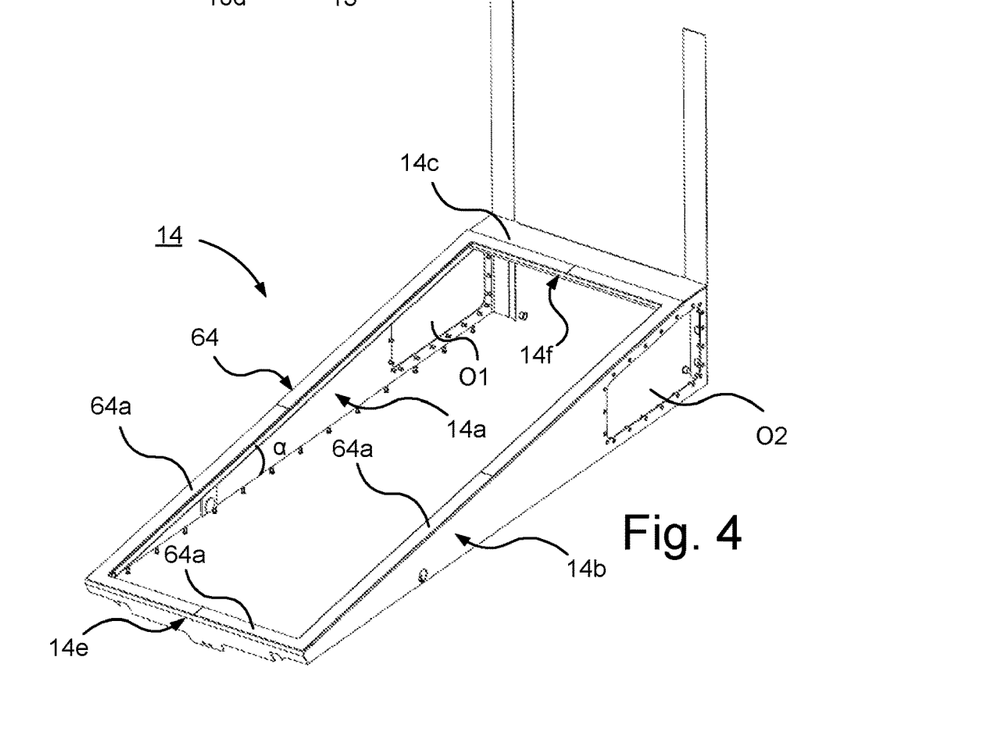
FIG. 4 schematically illustrates a perspective view of an upper part of the vehicle frame in FIG. 3 with a contact surface for sealing against the cab.

The vehicle frame 10 further comprises an extension frame 14 forming an extension in a substantially vertical direction. The extension frame 14 is illustrated in FIG. 4 as a separate part of the vehicle frame 10. The extension frame 14 is thus according to this embodiment a separate part attachable to the part of the vehicle frame 10 with the bottom element 13.

The extension frame 14 has a right wall element 14a constituting a part of the right wall element 11 and a left wall element 14b constituting a part of the left wall element 12, the wall elements 14a, 14b of the extension frame 14 thus extending in the longitudinal direction of the vehicle 1. The wall elements 14a, 14b of the extension frame 14 are substantially vertically arranged.

The extension frame 14 is wedge-shaped so that the extension frame has a decreasing vertical extension in direction from the rear portion to a front portion of the vehicle frame. Thus, the wall elements 14a, 14b have a wedged shape. The longitudinal wall elements 14a, 14b are connected by transversal elements 14e, 14f forming a frame having a rectangular shape.

The height of the longitudinal wall elements 14a, 14b of the extension frame 14 is thus higher in the rear portion than in the front portion. The wall elements 14a, 14b of the extension frame 14 has openings O1, O2 in the rear portion of the respective wall element 14a, 14b for improved accessibility.

The extension frame 14 thus has a rectangular shape. The extension frame 14 comprises a contact surface 14c of the vehicle frame 10, the contact surface 14c being constituted by the upper sides of the elements 14a, 14b, 14e, 14f. The contact surface 14c forms a plane. The contact surface 14c thus has a planar configuration. The plane has a certain inclination a relative to the horizontal plane of the vehicle 1 due to the wedged shape of the extension frame 14. The contact surface 14c of the extension frame 14 thus has a frame configuration.

Figure 5:
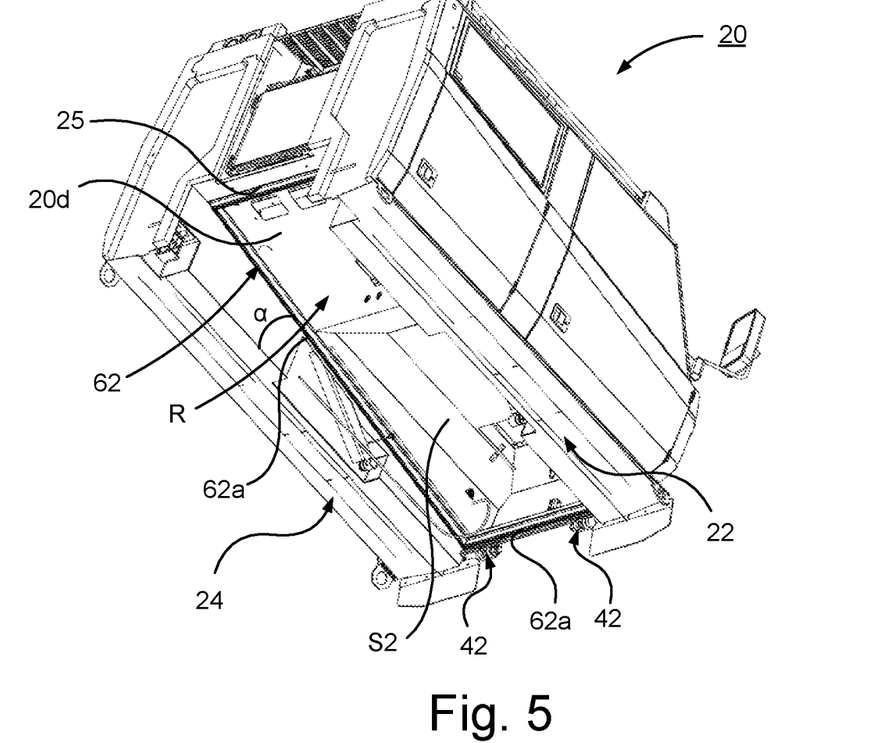
FIG. 5 schematically illustrates a perspective view of the cab of the tracked vehicle in FIG. 1a with a sealing element of a sealing arrangement according to an embodiment of the invention.
Figure 6:
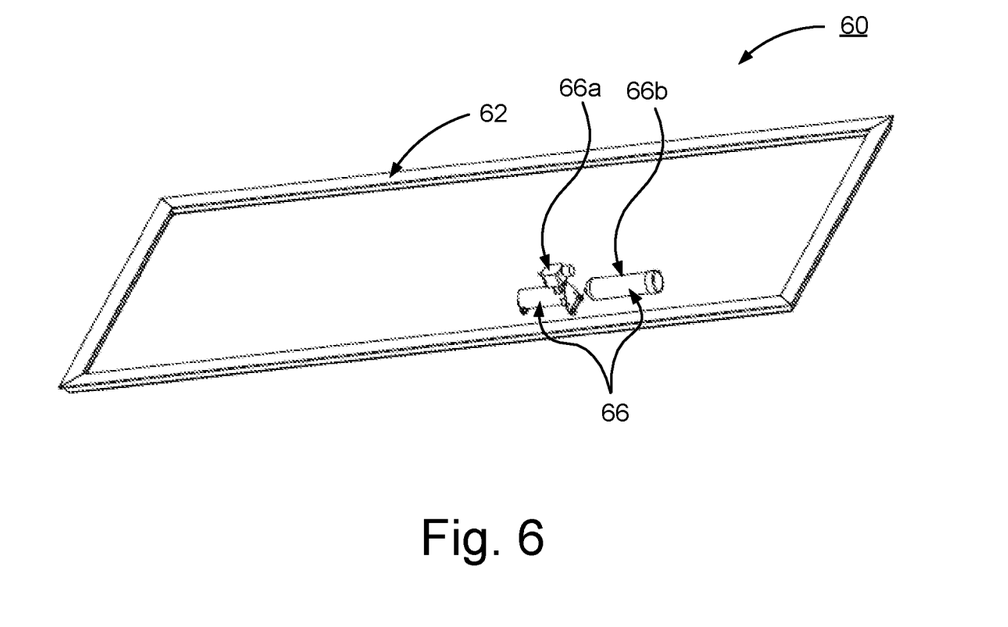
FIG. 6 schematically illustrates a perspective view of a part of the sealing arrangement according to an embodiment of the invention.

As shown in FIG. 5 the underside 20d of the cab 20 has a recess R for receiving the vehicle frame 10. The recess constitutes a space S2 for receiving the vehicle frame 10 and thus the engine configuration 50.

The recess R has a longitudinal extension running centrally on the underside of the cab 20. Thus, right and left wall portions 22, 24 of the right and left side of the cab 20 are extending below the recess. The recess R on the underside of the cab 20 comprises a contact surface 25 having a frame configuration. The contact surface 25 has a rectangular shape. The contact surface 25 is arranged to run peripherally in the recess 25. The contact surface 25 of the cab 20 is arranged along the inside of the wall portions 22, 24 and in connection to the front side and rear side of the underside 20d of the cab 20.

The contact surface 25 on the underside of the cab 20 is configured to form a plane. The contact surface 25 on the underside of the cab 20 thus has a planar configuration. The plane has a certain inclination a relative to the horizontal plane of the vehicle 1 corresponding to the inclination of the plane formed by the contact surface 14c of the vehicle frame 10, i.e. the contact surface 14c of the extension frame 14 of the vehicle frame.

The contact surface 25 on the underside of the cab 20 has a shape and size substantially corresponding to the contact surface 14c of the vehicle frame 10, i.e. the contact surface 14c of the extension frame 14 of the vehicle frame.

The cab 20 is thus configured such that wall portions 22, 24 of said cab 20 are configured to extend externally relative to and a certain distance downwardly along the wall elements 14a, 14b of said extension frame 14.

The contact surface 25 of the cab 20 is arranged to face the contact surface 14c of the vehicle frame in the closed position. Thus, the contact surface 25 of the cab 20 is arranged to be aligned with the contact surface 14c of the vehicle frame 10 in the closed position.

The vehicle 1 comprises a sealing arrangement 60 according to an embodiment of the present invention. The sealing arrangement 60 comprises sealing means 62, 64 arranged to provide sealing between the cab 20 and the vehicle frame 10 in the closed position of the vehicle 1. The sealing means 62, 64 is arranged to provide liquid tight sealing between the cab 20 and the vehicle frame 10.

The sealing means 62, 64 comprises a first sealing element 62 extending along the contact surface 25 of said cab 20. The sealing means 62, 64 comprises a second sealing element 64 extending along the contact surface 14c of the vehicle frame 10. The contact surfaces 25, 14c are thus defining a sealing plane for providing said sealing in the closed position by means of the sealing means 62, 64. By thus defining a sealing plane by means of said contact surfaces and having a first sealing element 62 extending along the contact surface 25 of the cab 20 and a second sealing element 64 extending along the contact surface 14c of the vehicle frame 10, i.e. the contact surface 14c of the extension frame 14 of the vehicle frame 10, an efficient sealing is obtained in the closed position of the cab 20.

The first sealing element 62 of the sealing means is thus arranged in connection to the contact surface 25 of the cab 20. The second sealing element 64 of the sealing means is thus arranged in connection to the contact surface 14c of the vehicle frame 10.

Thus, the at least one sealing element in the form of the first sealing element 62 of the sealing means, extending along the contact surface 25 of said cab is arranged recessed into the recess R on the underside of the cab so that a portion of the cab overhangs the sealing plane when the cab is in the closed position so as to provide additional protection of the sealing plane when the cab is in the closed position.

According to an embodiment at least one sealing element 62, 64 is a sealing strip.

The first sealing element 62 arranged in connection to the contact surface 25 of the cab 20 has a sealing surface 62a. The second sealing element 64 arranged in connection to the contact surface 14c of the vehicle frame 10 has a sealing surface 62a. The sealing surface 62a of the first sealing element 62 is arranged to be in contact with the sealing surface 64a of the second sealing element 64 in the closed position of the cab 20 so as to provide sealing between the cab 20 and the vehicle frame 10 in the closed position of the vehicle 1.

The first sealing element 62 arranged in connection to the contact surface 25 of the cab 20 is according to an embodiment inflatable as explained in more detail below with reference to FIG. 7. The first sealing element 62 may be made of any suitable material for providing efficient liquid tight sealing. The sealing material of the first sealing element 62 is according to an embodiment made of a material resistant against one or more of: heat, cold, liquids such as oil, gasoline etc. The sealing material of the first sealing element 62 is according to an embodiment made of a material resistant to wear. The sealing material of the first sealing element 62 is according to an embodiment made of an elastic material. The sealing material of the first sealing element 62 is according to an embodiment made of rubber. The sealing material of the first sealing element 62 is according to an embodiment made of silicone.

The second sealing element 64 arranged in connection to the contact surface 14c of the vehicle frame 10 is according to an embodiment made of stainless steel. By having the second sealing element 64 made of stainless steel provides an efficient sealing when interacting with the first sealing element 62 made of a rubber material. The second sealing element 64 may be made of other material with similar properties as stainless steel, such as a brass material, a conductive carbon fibre material, a copper material, a silver material or the like. The second sealing element 64 could alternatively be made of rubber or silicone.

The second sealing element 64 made of stainless steel is according to an embodiment attached to the contact surface by means of a welding joint. The second sealing element 64 made of stainless steel is thus welded to the contact surface 14c of the vehicle frame 10. The sealing arrangement 60 is, in the closed position, arranged to provide a confined space S1, S2 for protecting components comprising the engine configuration 50 of said vehicle 1 enclosed inside said space S1, S2. S1 is the space within the vehicle frame 10 as illustrated in FIG. 3 and S2 is the space within the underside 20d of the cab 20 as illustrated in FIG. 5, the enclosed space S1, S2 thus being constituted by the space S1 and space S2 as illustrated schematically beside the detail of the vehicle frame 10 and cab 20 in FIG. 7. Thus, in the closed position the space S1 of the vehicle frame 10 and the space S2 of the recess on the underside 20d of the cab forms a confined space by means of the contact surfaces 14c, 25 abutting each other so that the first and second sealing elements 62, 64 provides a sealing in the thus defined sealing plane. The contact surfaces 14c, 25 are thus arranged to abut each other via the sealing means 62, 64 in the closed position of the cab 20. By thus providing a confined space in the closed position of the cab 20 vehicle components such as components of an engine configuration are sealingly protected in an efficient way.

Figure 8:
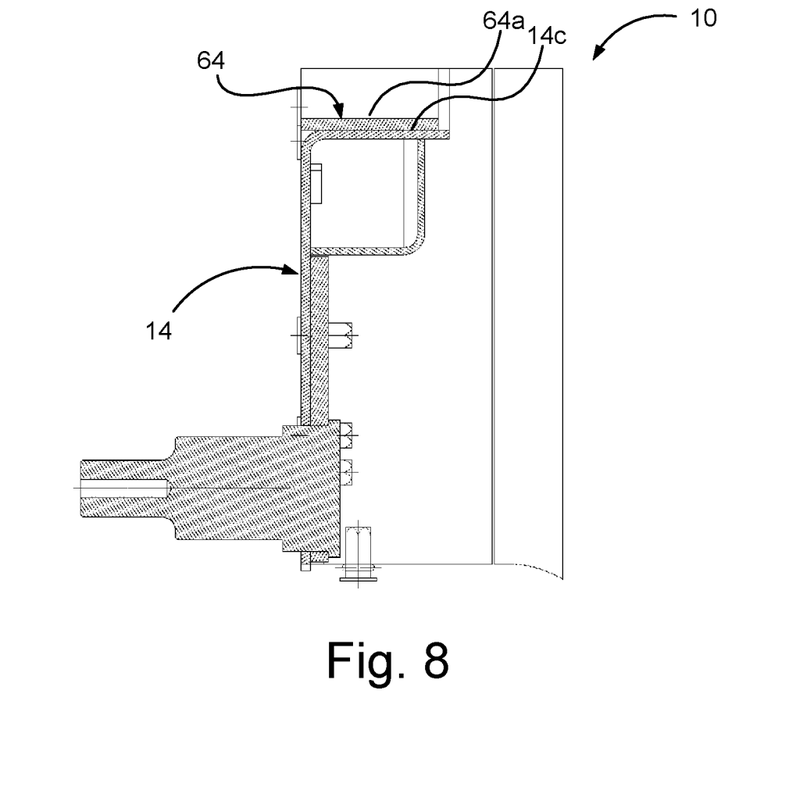
FIG. 8 schematically illustrates a cross sectional view of a part of the vehicle frame according to the present invention.

FIG. 8 schematically illustrates a cross sectional view of a part of the vehicle frame 10 with the contact surface 14c of the extension frame 14 of the vehicle frame 10 and the sealing element 64 arranged in connection to the contact surface 14c.

The contact surface 14c of the vehicle frame 10 is according to an embodiment made of metal, the metal according to an embodiment being steel. The vehicle frame 10 is according to an embodiment made of metal, the metal according to an embodiment being steel. As mentioned above the second sealing element 64 is according to an embodiment made of stainless steel and according to an embodiment welded to the contact surface 14c of the vehicle frame 10.

According to an alternative embodiment, not shown, the extension frame 14 is made of stainless steel of material with similar properties such as brass, conductive carbon fibre material, copper, or the like. In this case the contact surface 14c of the vehicle frame 10 will act as the sealing surface against which the first sealing element 62 is arranged to seal. Thus, in this case the sealing surface 62a of the first sealing element 62 is arranged sealingly abut the surface 14c of the vehicle frame by being in direct contact with the surface 14c.

The contact surface 25 of the cab 20 is according to an embodiment made of metal, the metal according to an embodiment being steel, according to an embodiment stainless steel.

The first sealing element 62 arranged in connection to the contact surface 25 of the cab 20 is inflatable.

The sealing arrangement 60 comprises means 66 for pressurising the first sealing element 62. The means 66 for pressurising the first sealing element 62 comprises a compressor unit 66a for pressurising air and an air source 66b connected to said compressor unit 66a for providing air to said compressor unit. The air source 66b is constituted by an accumulator tank. The means 66 for pressurising the first sealing element 62 is configured to inflate the inflatable first sealing element 62 by pressurising the first sealing element 62 by introducing pressurised air. Hereby an even more efficient sealing between the cab 20 and the vehicle frame 10 is obtained. Hereby an amphibious function of the vehicle 1 is improved. The pressurised first sealing element 62 is configured to be depressurised prior to tilting the cab 20 to the open position in order to prevent the sealing element 62 to be dislocated.

Figure 7:
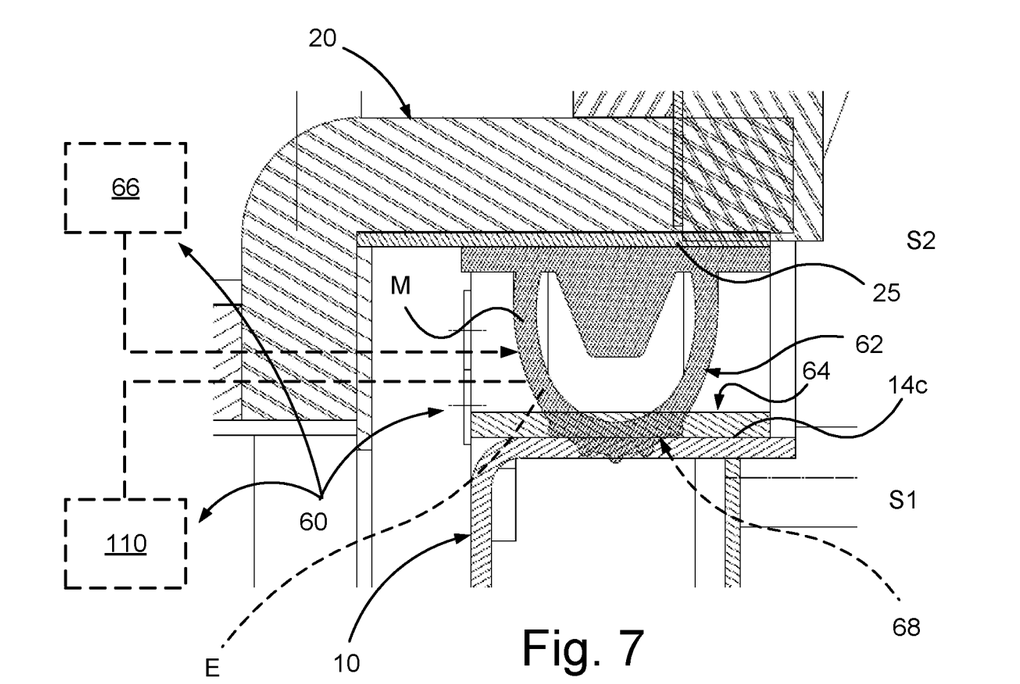
FIG. 7 schematically illustrates a cross sectional view of part of sealing between the cab and the vehicle frame by means of the sealing arrangement according to an embodiment of the invention.

FIG. 7 schematically illustrates a cross sectional view of part of sealing between the cab 20 and the vehicle frame 10 by means of the sealing arrangement according to an embodiment of the invention. The cab 20 of the vehicle 1 is in the closed position. The sealing means 62, 64 comprising the first sealing element 62 arranged in connection to the contact surface 25 of the cab 20 and the second sealing element 64 arranged in connection to the contact surface 14c of the vehicle frame 10 are arranged to provide sealing between the cab 20 and the vehicle frame 10 in said closed position. Here the inflatable first sealing element 62 is in the inflated state. The first sealing element 62 is configured to seal against the second sealing element 64 is the sealing plane formed by the contact surfaces 25, 14a.

The means 66 for pressurising the first sealing element 62 is connected to the first sealing element 62.

The sealing arrangement 60 comprises means 110 for determining the pressure of the first sealing element 62. The means 110 for determining the pressure comprises at least one pressure sensor unit.

Figure 9:
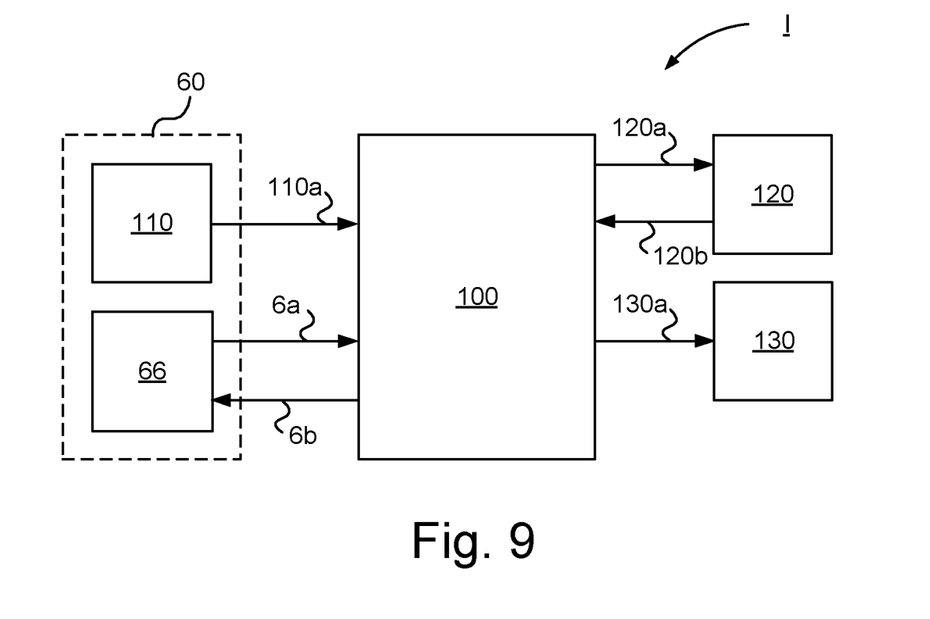
FIG. 9 schematically illustrates a system for controlling the pressure of an inflatable sealing element of the sealing arrangement.

FIG. 9 schematically illustrates a system I for controlling the pressure of an inflatable sealing element of a sealing arrangement 60 according to the present invention.

The system I comprises an electronic control unit 100.

The system I comprises means 110 for determining the pressure of the inflatable sealing element. The means 110 for determining the pressure comprises at least one pressure sensor unit.

The system I comprises means 66 for pressurising the inflatable sealing element so as to inflate the sealing element. The means 66 for pressurising the inflatable sealing element comprises a compressor unit.

The system I comprises means 120 for monitoring the sealing arrangement 60.

The means 120 for monitoring the sealing arrangement 60 comprising the inflatable sealing element is configured to monitor the pressure of the sealing element. By thus monitoring the pressure of the sealing element a pressure drop may be detected caused by a leakage. The pressure is determined by the means 110, e.g. by one or more pressure sensor units.

The means 120 for monitoring the sealing arrangement 60 comprising the inflatable sealing element is configured to monitor the operation of the means 66 for pressurising the inflatable sealing element. By thus monitoring the operation of the means 66 for pressurising the inflatable sealing element, i.e. the operation of the compressor unit, possible leakage of the sealing element may be determined if the compressor unit need to be reactivated or run for a longer time than expected.

The system I comprises means 130 for presenting the status of the sealing arrangement 60. The means 130 for presenting the status of the sealing arrangement 60 is configured to present the status to the operator of the vehicle. The means 130 for presenting the status of the sealing arrangement 60 is arranged to present a pressure loss in the inflatable sealing element. The means 130 for presenting the status of the sealing arrangement 60 is arranged to present a leakage in the inflatable sealing element.

The means 130 for presenting the status of the sealing arrangement 60 comprises according to a variant sound means for audible presentation such as sound alarm, a voice message or the like. The means 130 for presenting the status of the sealing arrangement 60 comprises according to a variant visual means for visually presenting the loss of pressure of the inflatable sealing element.

The system I thus constitutes control means 100 for controlling the pressure of an inflatable sealing element.

The electronic control unit 100 is operatively connected to the means 110 for determining the pressure of the inflatable sealing element via a link 110a. The electronic control unit 100 is via the link 110a arranged to receive a signal from the means 110 representing pressure data for current pressure in the inflatable sealing element.

The electronic control unit 100 is operatively connected to the means 66 for pressurising the inflatable sealing element via a link 6a. The electronic control unit 100 is via the link 6a arranged to receive a signal from the means 66 representing data for operation status of the means 66. The data for operation status of the means 66 comprises data for required reactivation of the means 66. The data for operation status of the means 66 comprises data for required time for operation of the means 66 in order to pressurise the sealing element/maintain the sealing element pressurised.

The electronic control unit 100 is operatively connected to the means 66 for pressurising the inflatable sealing element via a link 6b. The electronic control unit 100 is via the link 6b arranged to send a signal to the means 66 representing data for operating the means 66, comprising data for reactivating the means 66, comprising data for reactivating the means 66, and data for deactivating the means 66.

The electronic control unit 100 is operatively connected to the means 120 for monitoring the sealing arrangement 60 via a link 120a. The electronic control unit 100 is via the link 120a arranged to send a signal to the means 120 representing data for status of the sealing arrangement 60. The data for status of the sealing arrangement 60 comprises according to an embodiment data for pressure of the inflatable sealing element of the sealing arrangement 60. The data for status of the sealing arrangement 60 comprises according to an embodiment data for operation of the means 66 for pressurising the sealing element of the sealing arrangement 60.

The electronic control unit 100 is operatively connected to the means 120 for monitoring the sealing arrangement 60 via a link 120b. The electronic control unit 100 is via the link 120b arranged to receive a signal from the means 120 representing data for status of the sealing arrangement 60. The electronic control unit 100 is according to an embodiment arranged to process the data for status of the sealing arrangement so as to determine possible action.

The electronic control unit 100 is operatively connected to the means 130 for presenting the status of the sealing arrangement 60 via a link 130a. The electronic control unit 100 is via the link 130a arranged to send a signal to the means 130 representing presentation data for status of the sealing arrangement 60. The presentation data may comprise data for audible presentation and/or visual data for visual presentation.

Figure 11:
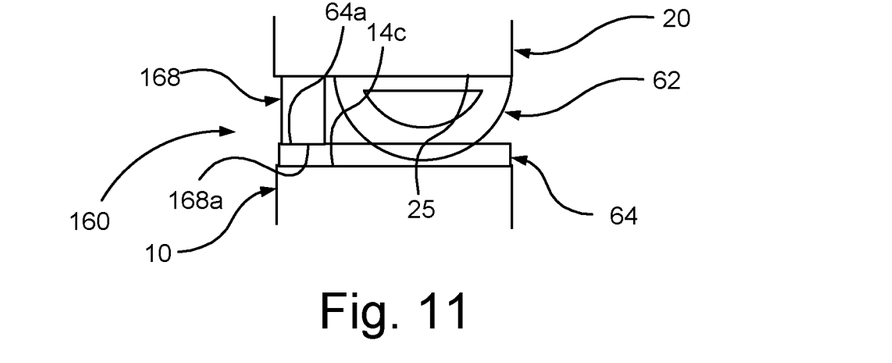
FIG. 11 schematically illustrates a cross sectional view of part of sealing between the cab and the vehicle frame by means of the sealing arrangement according to an embodiment of the invention.
Figure 12:
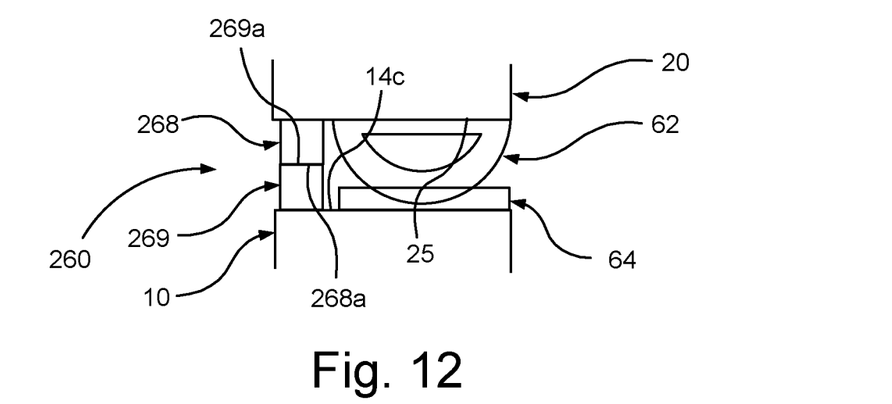
FIG. 12 schematically illustrates a cross sectional view of part of sealing between the cab and the vehicle frame by means of the sealing arrangement according to an embodiment of the invention.
Figure 13:
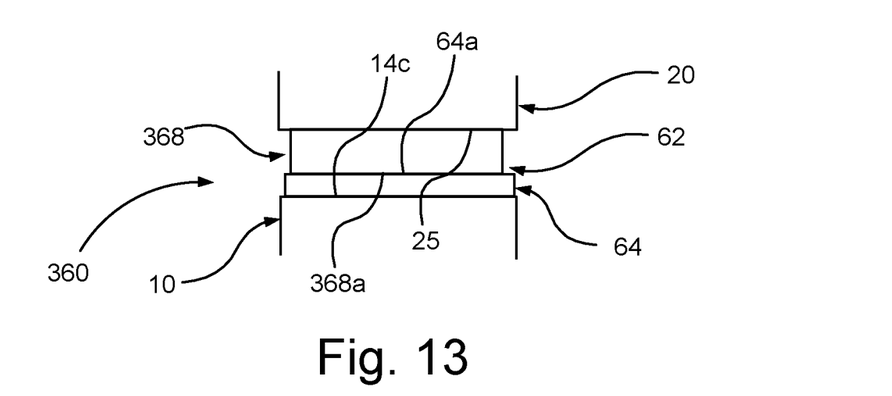
FIG. 13 schematically illustrates a cross sectional view of part of sealing between the cab and the vehicle frame by means of the sealing arrangement according to an embodiment of the invention.

FIG. 11-13 schematically illustrates cross sectional view of part of sealing between the cab 20 and the vehicle frame 10 by means of the sealing arrangement 160; 260; 360 arranged to provide electromagnetic sealing according to embodiments of the invention.

According to embodiments of the sealing arrangement 160; 260; 360 the sealing arrangement 160; 260; 360 is arranged to provide electromagnetic sealing in the closed position so as to control the emitted electromagnetic signature within said confined space. The sealing means of the sealing arrangement comprises means 168; 268, 269; 368 for providing electromagnetic sealing in the closed position so as to control the emitted electromagnetic signature within said confined space. In the closed position, the sealing between the vehicle frame 10 and the cab 20 are arranged to provide a metal box, i.e. a Faraday cage for the confined space for protecting components of the vehicle enclosed inside said space. In the closed position the vehicle frame 10 and the cab 20 forms a metal cage. The means 168; 268, 269; 368 for providing electromagnetic sealing provides an electrically conductive connection between the cab and the vehicle frame. Hereby a sealing with electromagnetic compatibility, a so called EMC-sealing, is obtained controlling the emitted electromagnetic signature within the space in the closed position of the cab 20. Hereby single components of the engine configuration do not need to be sealed individually which reduces costs.

According to an embodiment of the sealing arrangement 160 illustrated in FIG. 11 the means for providing electromagnetic sealing comprises a sealing element 168 arranged in connection to the contact surface 25 of the cab 20 in addition to the first sealing element 62 arranged in connection to the contact surface 25 of the cab 20. The sealing element 168 is arranged to provide an electrically conductive connection between the cab 20 and the vehicle frame 10 in the closed position of the vehicle. The sealing element 168 comprises a surface 168a arranged to be in contact with the surface 64a of the second sealing element 64. Both the first sealing element 62 and the sealing element 168 for electromagnetic sealing are arranged to be in sealing contact with the second sealing element 64 arranged on the contact surface 14c of the vehicle frame 10 for liquid sealing and electromagnetic sealing respectively. The sealing element for the electromagnetic sealing is made of an electrically conductive material, for example, brass, conductive carbon fibre, copper, silver, steel such as stainless steel or the like. The contact surface of the cab and the contact surface of the vehicle frame are also made of a conductive material such as steel in order to obtain an electromagnetic sealing by means of an electric contact there between. The sealing element 168 is thus arranged along the contact surface 25 of the cab 20. The sealing element 168 is according to this embodiment arranged to run substantially parallel to the inflatable first sealing element 62.

According to an embodiment the sealing arrangement 260 illustrated in FIG. 12 the means for providing electromagnetic sealing comprises a sealing element 268 arranged in connection to the contact surface 25 of the cab 20 and a sealing element 269 arranged in connection to the contact surface 14c of the vehicle frame 10, the surface 268a of the sealing element 268 being arranged to be in contact with the surface 269a of the sealing element 269 in the closed position of the vehicle. The sealing element 268 is thus arranged along the contact surface 25 of the cab and the sealing element 269 is arranged along the contact surface 14c of the vehicle frame 10. The sealing element 268 is according to this embodiment arranged to run substantially parallel to the inflatable first sealing element 62 and the sealing element 269 is according to this embodiment arranged to run substantially parallel to the second sealing element 64.

According to an embodiment the sealing arrangement 360 illustrated in FIG. 13 the means for providing electromagnetic sealing comprises a sealing element 368 arranged in connection to the contact surface 25 of the cab 20 and the second sealing element 64 arranged in connection to the contact surface 14c of the vehicle frame 10, the surface 368a of the sealing element 368 being arranged to be in contact with the surface 64a of the second sealing element 64 in the closed position of the vehicle. The sealing element 368 is thus arranged along the contact surface 25 of the cab 20. The second sealing element 64 is of an electrically conductive material. In this embodiment only an electromagnetic sealing is provided.

According to an embodiment of the sealing arrangement, as illustrated in FIG. 7 as an alternative variant, the means for providing electromagnetic sealing comprises the inflatable sealing element 62, the inflatable sealing element 62 comprising, in addition to the material suitable for liquid tight sealing such as rubber and/or silicone, an electrically conductive material E so as to provide an electrically conductive contact between the contact surface of the cab 20 and the contact surface 14c of the vehicle frame 10 for providing, in addition to liquid tight sealing, an electromagnetic sealing. Thus, the inflatable sealing element 62 comprises means 68 for providing electromagnetic sealing. The inflatable sealing element 62 is thus composed of a material M for liquid tight sealing and an electrically conductive material E.

The sealing arrangement 160 according to the embodiment illustrated in FIG. 11 may comprise the means 66 for pressurising the inflatable sealing element 62. The sealing arrangement 160 according to the embodiment illustrated in FIG. 11 may comprise the means 100 for controlling the pressure of the inflatable sealing element 62. The sealing arrangement 160 according to the embodiment illustrated in FIG. 11 may be comprised in the system I.

The sealing arrangement 260 according to the embodiment illustrated in FIG. 12 may comprise the means 66 for pressurising the inflatable sealing element 62. The sealing arrangement 260 according to the embodiment illustrated in FIG. 12 may comprise the means 100 for controlling the pressure of the inflatable sealing element 62. The sealing arrangement 260 according to the embodiment illustrated in FIG. 12 may be comprised in the system I.

Above, with reference to FIGS. 11-13 and also to FIG. 7, the sealing means for providing electromagnetic sealing is provided by means of one or more sealing elements for providing electrically conductive contact between the contact surface 25 of the cab 20 and the contact surface of the vehicle frame 10. The means for providing electromagnetic contact between the cab 20 and the vehicle frame 10 may be obtained via other contact surfaces of the cab 20 and vehicle frame 10 such as e.g. between the inner surface of the wall portions 22, 24 of the cab and the outer surface of the extension frame 14, one or more electrically conductive sealing elements then being arranged in connection to the inner surface of said walls 22, 24 and/or the outer surface of the extension frame 14.

The vehicle 1 further comprises a stand 80 vertically arranged in connection to the rear side of the vehicle frame 10, the stand 80 being shown in e.g. FIG. 1a and FIG. 7. The stand 80 is configured to receive and support a fuel tank 82 of the vehicle 1. The stand 80 is further arranged to receive a cooler device 84 of the vehicle 1. The fuel tank 82 and the cooler device 84 are vertically arranged in connection to the stand 80. The stand 80 is connected to the rear portion of the extension frame 14 of the vehicle frame 10. The stand 80 is according to an embodiment connected to the vehicle frame 10 by means of a welded joint. The extension frame with the rear portion thus facilitates an efficient and stable attachment of fuel tank 82 and cooler device 84 which may be arranged vertically at the rear portion of the vehicle frame via the stand 80.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An amphibious vehicle comprising a vehicle frame and a cab supported by said vehicle frame, characterized in that said cab being connected to said vehicle frame via a hinge so as to allow tilting of said cab about said hinge between a closed position and an open position, wherein said vehicle comprises a sealing arrangement comprising a seal arranged to provide liquid tight sealing between the cab and the vehicle frame in said closed position, wherein in the closed position, the sealing arrangement is arranged to provide a confined space for protecting components of said vehicle enclosed inside said space, wherein the seal comprises an electrically conductive electromagnetic sealing element with an electrically conductive surface that makes an electrical contact with a second electrically conductive surface when the vehicle frame and the cab are in the closed position such that a Faraday cage is formed by the vehicle frame and the cab through the electrical contact in the closed position so as to control an emitted electromagnetic signature within said confined space.

2. The amphibious vehicle according to claim 1, wherein a said cab and said vehicle frame comprises a contact surface, and wherein the contact surface of said cab is arranged to face the contact surface of said vehicle frame in the closed position.

3. The amphibious vehicle according to a claim 2, wherein said seal comprises at least one sealing element extending along the contact surface of said cab and/or the contact surface of said vehicle frame, said surface defining a sealing plane for providing said sealing in the closed position.

4. The amphibious vehicle according to claim 3, wherein the seal for providing liquid tight sealing in the closed position comprises a first sealing element of the seal arranged in connection to the contact surface of the cab.

5. The amphibious vehicle according to claim 4, wherein the seal for providing liquid tight sealing in the closed position comprises a second sealing element of the seal arranged in connection to the contact surface of the vehicle frame.

6. The amphibious vehicle according to claim 5, wherein said first sealing element and/or said second sealing element are inflatable.

7. The amphibious vehicle according to claim 2, wherein the contact surface of said cab and/or the contact surface of said vehicle frame has a frame configuration.

8. The amphibious vehicle according to claim 2, wherein the contact surface of said cab and said vehicle frame has a planar configuration.

9. The amphibious vehicle according to claim 5, further comprising a control unit for controlling the pressure of the inflatable sealing element.

10. The amphibious vehicle according to claim 1, further comprising an engine for driving the vehicle, where the engine is housed in the vehicle frame in the confined space.

11. The amphibious vehicle according to claim 3, wherein the at least one sealing element extending along the contact surface of said cab is arranged recessed into a recess on the underside of the cab so that a portion of the cab overhangs the sealing plane when the cab is in the closed position.

12. The amphibious vehicle according to claim 1 wherein said vehicle is a tracked vehicle.

* * * * *